April 24, 1934. H. H. BURTON 1,956,146
IMPROVEMENTS IN OR RELATING TO LIQUID CONTAINERS
Filed Oct. 8, 1932
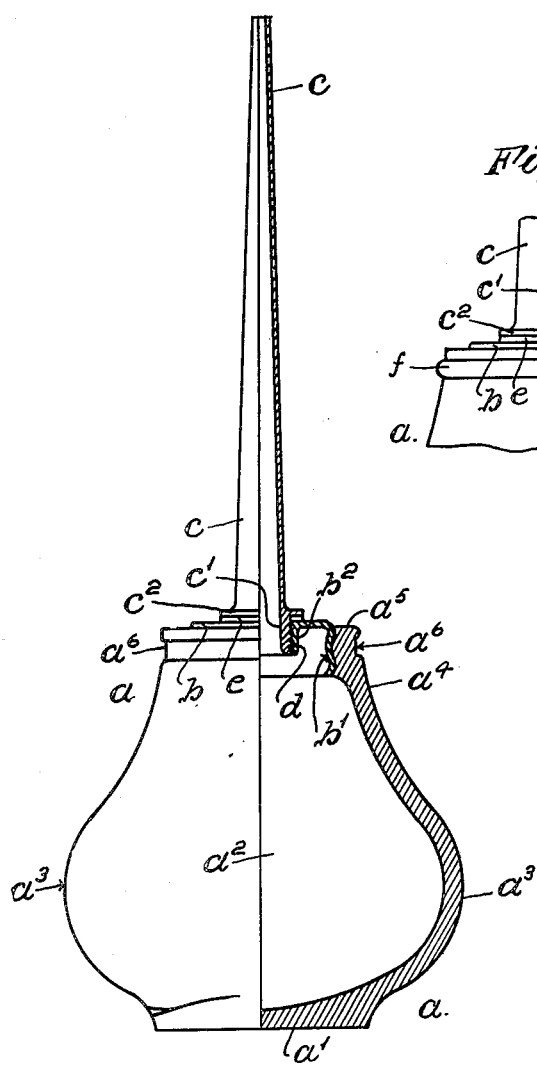
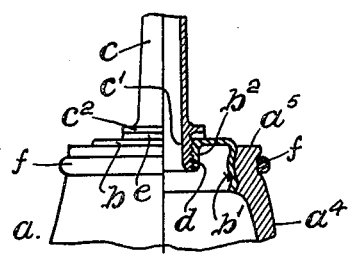
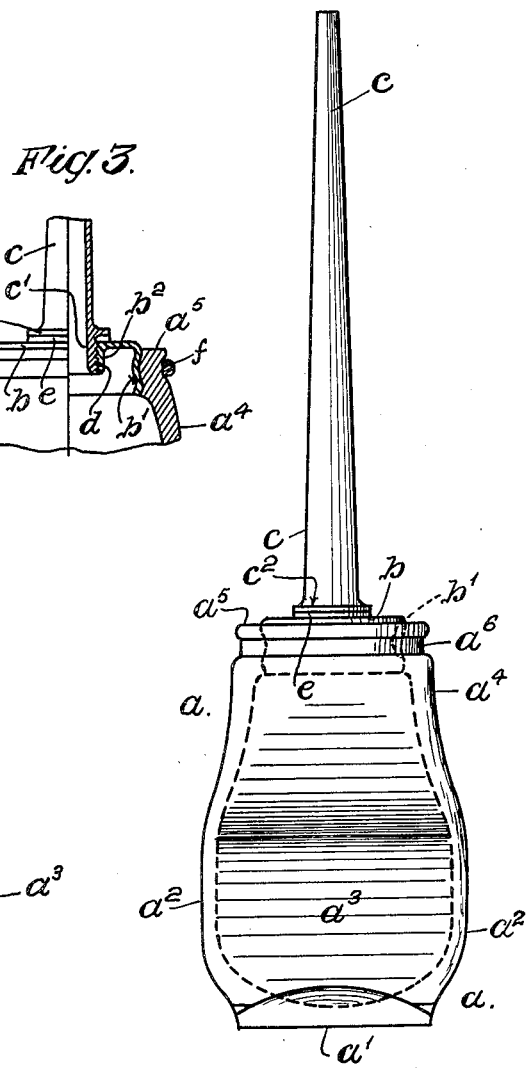

Patented Apr. 24, 1934

1,956,146

UNITED STATES PATENT OFFICE 1,956,146

IMPROVEMENTS IN OR RELATING TO LIQUID CONTAINERS

Hubert Henry Burton, Leicester, England

Application October 8, 1932, Serial No. 636,812
In Great Britain October 9, 1931

4 Claims. (Cl. 221—32)

This invention relates to liquid containers or holders and has for its object to provide a new or improved form of container or receptacle which may be readily filled with liquid when so desired and from which the contents may be squirted or otherwise discharged as required. The improved container or receptacle is, however, more especially adapted for the use of motorists and cyclists since it serves as an extremely neat, simple and inexpensive holder for lubricating oil, and also constitutes a means whereby such lubricant may be continuously supplied to machine parts at a high pressure or velocity and in a controlled manner, thus ensuring efficient lubrication of internal parts to which oil cannot readily be supplied if metal oil cans of usual diaphragm type are employed.

An oil or other liquid container or receptacle, according to my invention, broadly comprises or includes a resilient or elastic hollow liquid-receiving body portion made of a suitable rubber which is unaffected by the action of the liquid and a rigid discharge nozzle or spout, preferably made of metal, which is detachably secured to said resilient or elastic body portion by the aid, say, of a centrally-apertured plug or ring-like retaining member—also preferably made of metal—anchored in or around a neck or apertured portion of the resilient body. Thus, it is merely necessary to detach said rigid discharge nozzle or spout from the retaining plug or ring-like connecting member in order to pour oil through the now exposed central orifice or opening of the plug or ring into the rubber body of the container, and, after the application of the spout to the plug or ring, the lubricant may be readily and continuously ejected at the desired pressure through the discharge spout by gripping and squeezing the rubber body portion between the fingers. Said body portion, of course, regains its normal shape or configuration immediately the finger pressure thereon is relieved.

I will further describe my invention with the aid of the accompanying sheet of explanatory drawing which illustrates, by way of example only, one mode of carrying the same into effect.

In said drawing:—

Fig. 1 is a part sectional elevation, and Fig. 2 an elevation viewed at right angles to Fig. 1, of an oil container constructed in accordance with the invention.

Fig. 3 is a fragmentary detail of an oil container of slightly modified construction.

In these views, $a$ generally represents a resilient or elastic hollow body or receptacle which is moulded from rubber to provide a flat end or base portion $a^1$ of elliptical or circular shape or configuration and two flat opposed side wall or diaphragm portions $a^2$, $a^2$ joined at their respective sides or ends by integral bulbous portions $a^3$, $a^3$ which, with said side walls, merge into an upwardly or outwardly extending circular neck portion $a^4$ of gradually tapering formation. The narrow upper or outer end $a^5$ of said rubber neck portion of the container body is internally corrugated, as shown, or otherwise formed to provide the necessary anchorage for the correspondingly-formed depending rim or flange $b^1$ of the circular metal disc $b$ whereto the lower or inner end of a tapered metal discharge nozzle or spout $c$ is detachably connected as, for example, by screwing an integral threaded stem $c^1$ thereof into an internally-tapped central filling orifice $d$ of the disc, such orifice being conveniently created by a small annular flange or boss portion $b^2$ of the disc.

Preferably, said discharge nozzle or spout $c$ is positively maintained in locking engagement with the metallic disc $b$ mounted in the neck $a^4$ of the rubber container body $a$ by the aid of an annular shoulder $c^2$ formed on the spout in such a position as to bind against the top of said disc when the spout is applied to the rubber body; a suitable packing washer $e$ mounted on the stem $c^1$ of the spout is also conveniently interposed between said locking shoulder $c^2$ and the disc $b$ to prevent leakage of oil from the rubber receptacle $a$ where the spout is connected to the disc.

In order to definitely prevent disconnection of the metallic disc or cap $b$ from the rubber neck portion $a^4$ of the container whilst the discharge spout $c$ is being unscrewed from said cap, there is preferably provided a spring metal ring clip $f$—see Fig. 3—which is fitted into an external circumferential groove or recess $a^6$ formed for its reception in the portion of the neck surrounding the disc flange $b^1$.

Further, a small closure cap or cover of screw or other convenient type or pattern may be detachably mounted on the discharge end or tip of the nozzle or spout $c$ to seal the same when the oil container or receptacle is not required for use.

Oil containers or receptacles constructed in the manner hereinbefore described may be made in various sizes according to their intended purpose or application.

What I now claim as my invention and desire to secure by Letters Patent is:—

1. A container for liquids comprising an elastic hollow body moulded from rubber and having a flat base, two flat opposed diaphragm portions, two bulbous portions joining said diaphragm portions, and an outwardly extending tapered neck joining said bulbous and diaphragm portions, said neck having circumferential corrugations in its outer end part, a metallic discharge spout, a centrally apertured metallic disc at the base of said spout, and an annular securing flange provided on said disc, said flange being formed with circumferential corrugations engaging in said corrugated part of the body neck and retained therein by the elastic gripping effect of such neck on the flange.

2. A container for liquids comprising an elastic hollow body moulded from rubber and having a flat base, two flat opposed diaphragm portions, two bulbous portions joining said diaphragm portions, and an outwardly extending tapered neck joining said bulbous and diaphragm portions, said neck having internal circumferential corrugations in its outer end part, a metallic discharge spout, a centrally apertured metallic disc at the base of said spout, an annular securing flange on said disc, said flange being circumferentially corrugated and engaged in said corrugated part of the elastic body neck, an external annular groove in said body neck, and a spring metal retaining clip located in said groove to maintain an elastic gripping effect of said corrugated part of the body neck upon said correspondingly corrugated flange of the spout-securing disc.

3. A container for liquids comprising an elastic hollow body moulded from rubber and having a flat base, two flat opposed diaphragm portions, two bulbous portions joining said diaphragm portions, and an outwardly extending tapered neck joining said bulbous and diaphragm portions, said neck having internal circumferential corrugations in its outer end part, a metallic disc provided with a circumferentially corrugated annular securing flange engaged in said corrugated part of the elastic body neck, a spring metal retaining clip located in an external annular groove of said body neck to maintain an elastic gripping effect of said corrugated part of the neck upon the corrugated flange of said disc, a tapered metallic discharge spout, said spout being formed at its base with an externally screwthreaded stem portion, and a tapped filling orifice formed in said disc and wherein said stem portion of the spout is screwed, said orifice being created by the formation of a centrally disposed annular flange on said spout-securing disc of the elastic body.

4. A container for liquids comprising an elastic hollow body moulded from rubber and having a flat base, two flat opposed diaphragm portions, two bulbous portions joining said diaphragm portions, and an outwardly extending tapered neck joining said bulbous and diaphragm portions, said neck having internal circumferential corrugations in its outer end part, a metallic disc provided with a circumferentially corrugated annular securing flange engaged in said corrugated part of the elastic body neck, a spring metal retaining clip located in an external annular groove of said body neck to maintain an elastic gripping effect of said corrugated part of the neck upon the corrugated flange of said disc, a tapered metallic discharge spout provided at its base with a stem portion screwed into a tapped orifice created by the formation of a central annular flange on said spout-securing disc of the elastic body, and an annular shoulder and sealing washer provided on said spout between the base thereof and said screwed stem to prevent leakage of liquid from the elastic body by way of said filling orifice of the spout-securing disc.

HUBERT HENRY BURTON.